US011390309B2

(12) United States Patent
Candelario

(10) Patent No.: US 11,390,309 B2
(45) Date of Patent: Jul. 19, 2022

(54) CONVERTIBLE CART

(71) Applicant: Christian Candelario, New York, NY (US)

(72) Inventor: Christian Candelario, New York, NY (US)

( * ) Notice: Subject to any disclaimer, the term of this patent is extended or adjusted under 35 U.S.C. 154(b) by 47 days.

(21) Appl. No.: 17/141,219

(22) Filed: Jan. 4, 2021

(65) Prior Publication Data
US 2021/0206413 A1     Jul. 8, 2021

Related U.S. Application Data

(60) Provisional application No. 62/957,034, filed on Jan. 3, 2020.

(51) Int. Cl.
*B62B 3/02* (2006.01)
*B62B 5/06* (2006.01)
*B62B 3/00* (2006.01)

(52) U.S. Cl.
CPC ............... *B62B 3/02* (2013.01); *B62B 3/005* (2013.01); *B62B 5/06* (2013.01)

(58) Field of Classification Search
CPC .............. B62B 3/02; B62B 3/005; B62B 5/06
See application file for complete search history.

(56) References Cited

U.S. PATENT DOCUMENTS

| 4,726,602 | A  | * | 2/1988  | Sanders  | B62B 1/12 |
|           |    |   |         |          | 280/654 |
| 8,418,709 | B2 | * | 4/2013  | Lindeman | E04H 15/30 |
|           |    |   |         |          | 135/95 |
| 10,407,088 | B1 | * | 9/2019  | Le       | B62B 5/065 |
| 11,192,566 | B2 | * | 12/2021 | Ceja     | B62B 3/008 |
| 2016/0082996 | A1 | * | 3/2016 | Jackson | B62B 5/0485 |
|           |    |   |         |          | 280/33.996 |

* cited by examiner

*Primary Examiner* — Bryan A Evans

(57) ABSTRACT

A convertible cart allows for carriage of many items of different shapes in a position that provides a base with front and back walls, along with structural rods preventing items from sliding out of either side. A two-level tiered configuration may be best suited for carriage of larger, fragile items which cannot be stacked atop each other, or simply for organization of different large items. For the largest loads, a flat base arrangement maximizes both vertical space and available base area while providing the handlebar at an appropriate position for pushing or pulling. When transportation of items is complete, a flat configuration minimizes necessary storage space for the apparatus. These different arrangements are made possible through the employment of several rigid and telescoping members, which enable both custom handlebar arrangement and secure, intuitive adjustment between configurations. Swiveling wheels improve the mobility of the apparatus during use.

20 Claims, 6 Drawing Sheets

CONVERTIBLE CART

The current application claims a priority to the U.S. Provisional Patent application Ser. No. 62/957,034 filed on Jan. 3, 2020. The current application is filed on Jan. 4, 2021 while Jan. 3, 2021 was on a weekend.

FIELD OF THE INVENTION

The present invention relates generally to an item transportation cart. More specifically, the convertible cart relates to a manually-operated device which provides surfaces capable of supporting large quantities of various items. The present invention is also able to reconfigure those surfaces to optimally facilitate transportation of items of different sizes or quantities.

BACKGROUND OF THE INVENTION

A variety of tools may be used in order to transport large amounts of goods manually through a store, while moving, or in a variety of other situations. Devices such as shopping carts and baskets make it relatively easy for a grocery store customer to move groceries throughout a store and from the store to an awaiting vehicle. Similarly, larger palettes may be used by stock workers in order to resupply shelves with items and inventory as needed by a given retailer. Such tools are sometimes found to be adequate for general use in common situations.

However, such tools have several drawbacks. Conventional shopping carts are often unwieldy, requiring an undue amount of effort to change velocity or direction while pushing. Hand baskets are too small to be effective at carrying large items and are also weight-limited, quickly becoming too heavy to be useful in moving large amounts of small items. Larger trolley carts are more effective at both transporting large items and heavy loads; however, even these carts have drawbacks. The one-size-fits-all model of a trolley cart is ineffective on a case-by-case basis at moving smaller items, items of different shapes, or fragile items that cannot be stacked atop each other. What is needed is a trolley cart capable of shifting into an appropriate shape for carrying large amounts of items of any size or shape. Further desirable is a cart that can flatten for ease of storage or transportation between uses.

The present invention addresses these issues. The convertible cart allows for carriage of many items of different shapes in a position that provides a base with front and back walls, along with structural rods preventing items from sliding out of either side. A two-level tiered configuration may be best suited for carriage of larger, fragile items which cannot be stacked atop each other, or simply for organization of different large items. For the largest loads, a flat base arrangement maximizes both vertical space and available base area while providing the handlebar at an appropriate position for pushing or pulling. When transportation of items is complete, a flat configuration minimizes necessary storage space for the present invention. These different arrangements are made possible through the employment of several rigid and telescoping members, which enable both custom handlebar arrangement and secure, intuitive adjustment between configurations.

DETAILED DESCRIPTION OF THE INVENTION

All illustrations of the drawings are for the purpose of describing selected versions of the present invention and are not intended to limit the scope of the present invention.

Figure 1:
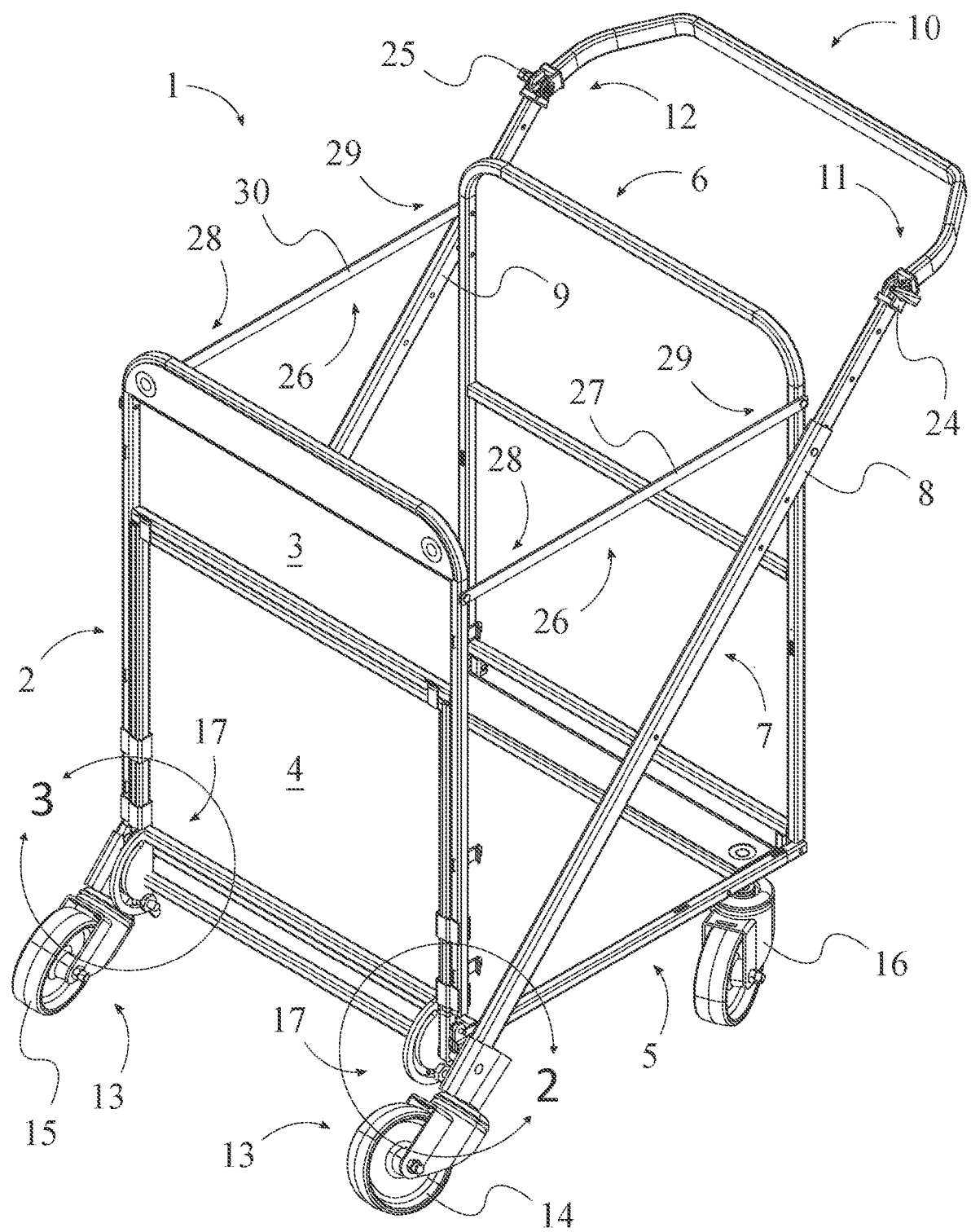
FIG. 1 is a perspective view of the present invention in the basket-cart configuration.

The present invention is a convertible cart that is used to organize and transport items. The present invention is configured to be adjustable to suit the needs of the items being moved, providing adjustable, durable surfaces that both protect items from shifting within the cart and enable support of heavy, or otherwise unwieldy, loads. A preferred embodiment of the present invention comprises a rack assembly 1, an extension frame 7, a handlebar frame 10, a pair of fixed wheels 13, a pair of rearrangeable casters 16, and an orientation mechanism 17, as seen in FIG. 1. The rack assembly 1 is the set of members which combine to form the retention space into which, in the preferred embodiment of the present invention, items may be placed and removed. The extension frame 7 is a mechanism which may adjust to appropriately position the handlebar frame 10 and to enable the present invention to shift between configurations as necessary. The handlebar frame 10 relates to the rigid member or members extending from the present invention which provide leverage and grip, thus facilitating movement of the present invention. The pair of fixed wheels 13 denotes a set of rotating members which improve the mobility of the present invention. The pair of rearrangeable casters 16 relates to a set of wheels utilized in conjunction with the pair of fixed wheels 13 that can be removed and replaced in appropriate positions based upon the needs of the user or the configuration of the present invention. The orientation mechanism 17 is a cam guide which provides guidance for the rack assembly 1, thus enabling the user to shift the rack assembly 1 as needed. The general configuration of the aforementioned components allows the present invention to efficiently and effectively store and transport items between adjacent locations. The rack assembly 1 comprises a first panel 2, a second panel 5, and a third panel 6, as shown in FIG. 1. The first panel 2 is a generally flat board or surface preferably made of perforated metal or linked wire which restricts the potential motion of items in the rack assembly 1. Similarly, the second panel 5 is another generally flat board or surface preferably made of perforated metal or linked wire which restricts the potential motion of items in the rack assembly 1, preferably supporting the weight of items from beneath. Further, the third panel 6 is another generally flat board or surface preferably made of perforated metal or linked wire which, together with the first panel 2 and the second panel 5, restricts the potential motion of items in the rack assembly 1. The first panel 2 is hingedly and adjacently connected to the second panel 5. This arrangement enables the first panel 2 to pivot about the second panel 5, thus allowing the present invention to shift configurations as needed. The third panel 6 is hingedly and adjacently connected to the second panel 5, opposite the first panel 2. In this way, the first panel 2 and the third panel 6 may be positioned parallel to each other in order to enable the present invention to form a securely contained space, or to allow the present invention to fold into a flat arrangement. The handlebar frame 10 is terminally mounted to the extension frame 7. This arrangement enables the user to conveniently access items through the extension frame 7. The pair of fixed wheels 13 is terminally and rotatably mounted to the extension frame 7, opposite the handlebar frame 10. In this way, the pair of fixed wheels 13 is always in appropriate position to support the present invention during use. The orientation mechanism 17 is positioned adjacent to the pair of fixed wheels 13. Thus, the orientation mechanism 17 utilizes the pair of fixed wheels 13 as a primary support device from the ground in any configuration of the present invention. The orientation mechanism 17 is positioned adjacent to the hinged connection between the first panel 2 and the second panel 5. This arrangement results in the orientation mechanism 17 being positioned relative to the handlebar frame 10, thus suggesting that, in an exemplary usage of the present invention, a user is conveniently positioned to manipulate the rack assembly 1 about the orientation mechanism 17 with the handlebar frame 10. The extension frame 7 is operatively coupled to the rack assembly 1 by the orientation mechanism 17, wherein the orientation mechanism 17 is used to reposition the extension frame 7 in relation to the rack assembly 1 for a selected configuration. The pair of rearrangeable casters 16 is mounted onto the rack assembly 1. This arrangement enables the pair of rearrangeable casters 16 to swivel in order to modify the direction of travel of the present invention.

For many item-transporting needs, it may be advantageous to provide a deep basket-like receptacle or carriage space. To this end, the rack assembly 1, the extension frame 7, and the pair of rearrangeable casters 16 may be arranged into a basket-cart configuration, as seen in FIG. 1. The basket-cart configuration provides a high-walled space, which can accommodate long or unconventionally-shaped items. The first panel 2 and the third panel 6 are fixed parallel and offset to each other. This arrangement provides both optimal volume and movement restraint, preventing items from falling toward or away from the handlebar frame 10. The second panel 5 is fixed perpendicular to the first panel 2 and the third panel 6. In this way, items are provided with a solid, generally flat base of support. The extension frame 7 is fixed at an acute angle with the second panel 5. The extension frame 7 may therefore arrange the handlebar frame 10 into optimal position for steering the present invention during use. The extension frame 7 is intersected by the third panel 6. Thus, the third panel 6 provides support for the extension frame 7, preventing the extension frame 7 from falling out of position due to gravity or other forces. The pair of rearrangeable casters 16 is mounted onto the second panel 5. In this way, the pair of rearrangeable casters 16 can support the weight of the rack assembly 1 and the items contained within the rack assembly 1. The pair of rearrangeable casters 16 is positioned offset from the pair of fixed wheels 13. Thus, the pair of rearrangeable casters 16 and the pair of fixed wheels 13 may evenly support the present invention during use.

Figure 4:
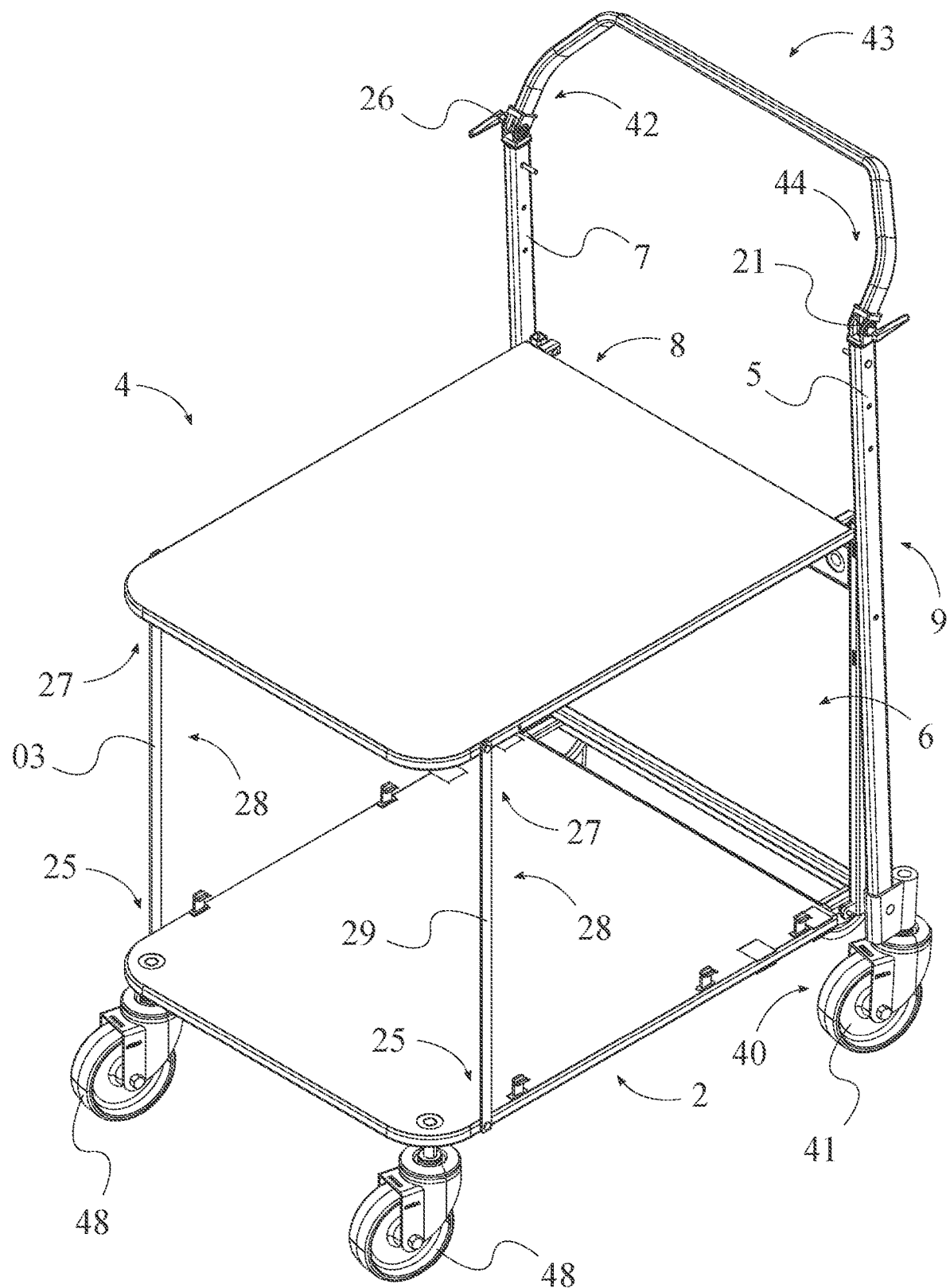
FIG. 4 is a perspective view of the present invention in the tiered-cart configuration.

A user of the present invention may have to transport fragile items which cannot be stacked atop each other. To provide for this, the rack assembly 1, the extension frame 7, and the pair of rearrangeable casters 16 may be arranged into a tiered-cart configuration, as represented in FIG. 4. The tiered-cart configuration provides two vertically-aligned surfaces for supporting items. The first panel 2 and the third panel 6 are fixed parallel and offset to each other. The space created by the offset is optimal for storage of generally flat items. The second panel 5 is fixed perpendicular to the first panel 2 and the third panel 6. In this configuration, the second panel 5 prevents items from extending beneath the user while the user operates the present invention. The extension frame 7 is fixed coincident with the second panel 5. In this way, the user may push and pull the present invention with optimal leverage. The pair of rearrangeable casters 16 is mounted onto the first panel 2. This arrangement ensures that the pair of rearrangeable casters 16 is able to support the present invention by pressing against the frame of the first panel 2. The pair of rearrangeable casters 16 is positioned offset from the pair of fixed wheels 13. Thus, the pair of rearrangeable casters 16 and the pair of fixed wheels 13 may support the present invention during use.

Figure 5:
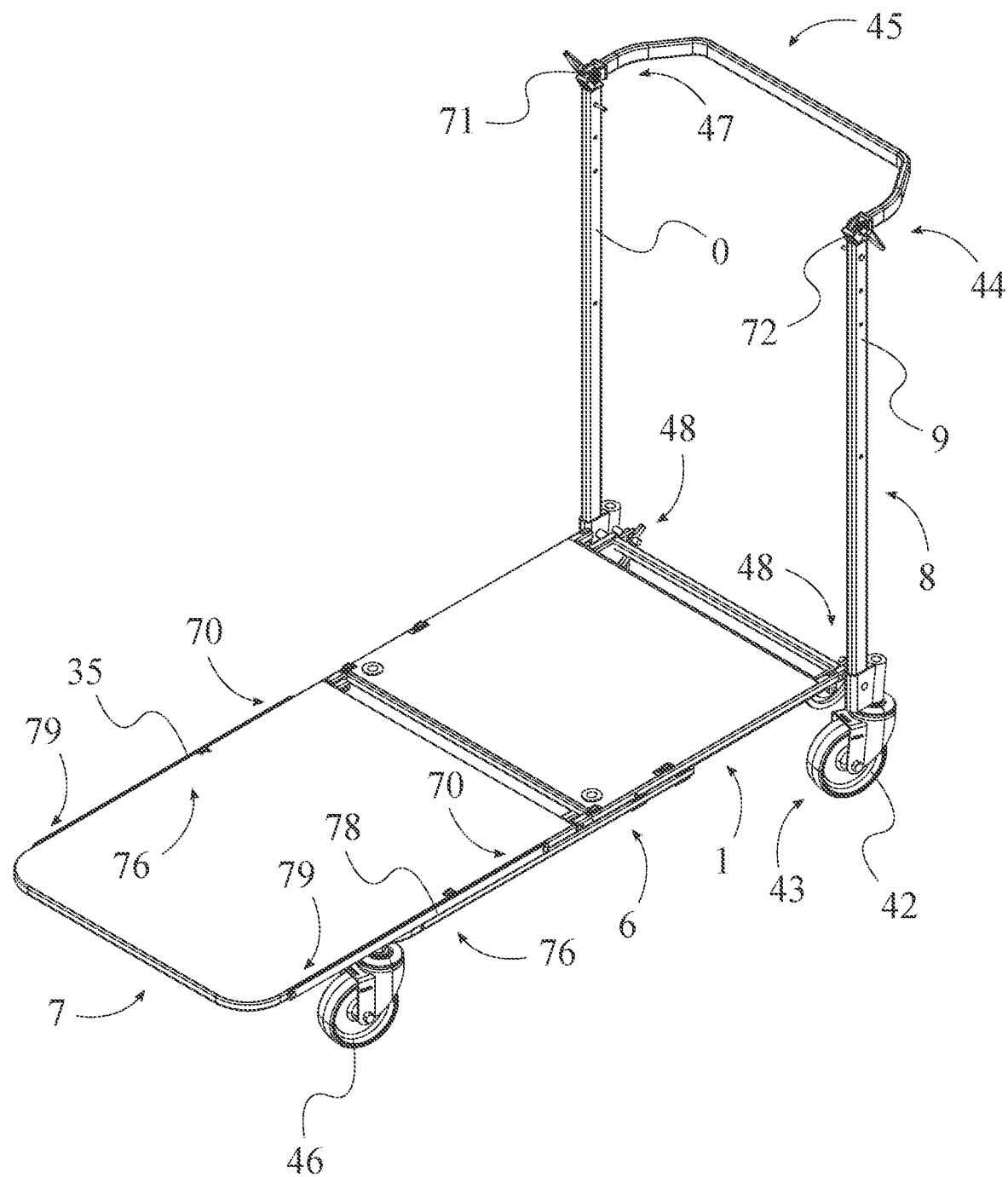
FIG. 5 is a perspective view of the present invention in the flat-cart configuration.

Often, it is necessary for a user to transport very large items across some distance. To accommodate for such items, the rack assembly 1, the extension frame 7, and the pair of rearrangeable casters 16 may be arranged into a flat-cart configuration, as shown in FIG. 5. The flat-cart configuration is an arrangement that provides a single flat surface for items to rest during transportation. The second panel 5 and the third panel 6 are fixed coplanar to each other. In this way, the second panel 5 and the third panel 6 form a generally flat surface. The first panel 2 is fixed parallel and adjacent to the second panel 5 and the third panel 6. Thus, the first panel 2, second panel 5, and third panel 6 each form a generally flat body optimized for support of very large items. The extension frame 7 is fixed perpendicular with the second panel 5. In this way, the handlebar frame 10 may be positioned in an optimal leverage, enabling a user to easily guide the present invention. The pair of rearrangeable casters 16 is mounted onto the first panel 2. This arrangement ensures that the pair of rearrangeable casters 16 are positioned to support the present invention by pressing against the frame of the first panel 2. The pair of rearrangeable casters 16 is positioned offset from the pair of fixed wheels 13. Thus, the pair of rearrangeable casters 16 and the pair of fixed wheels 13 may evenly support the present invention during use.

Figure 6:
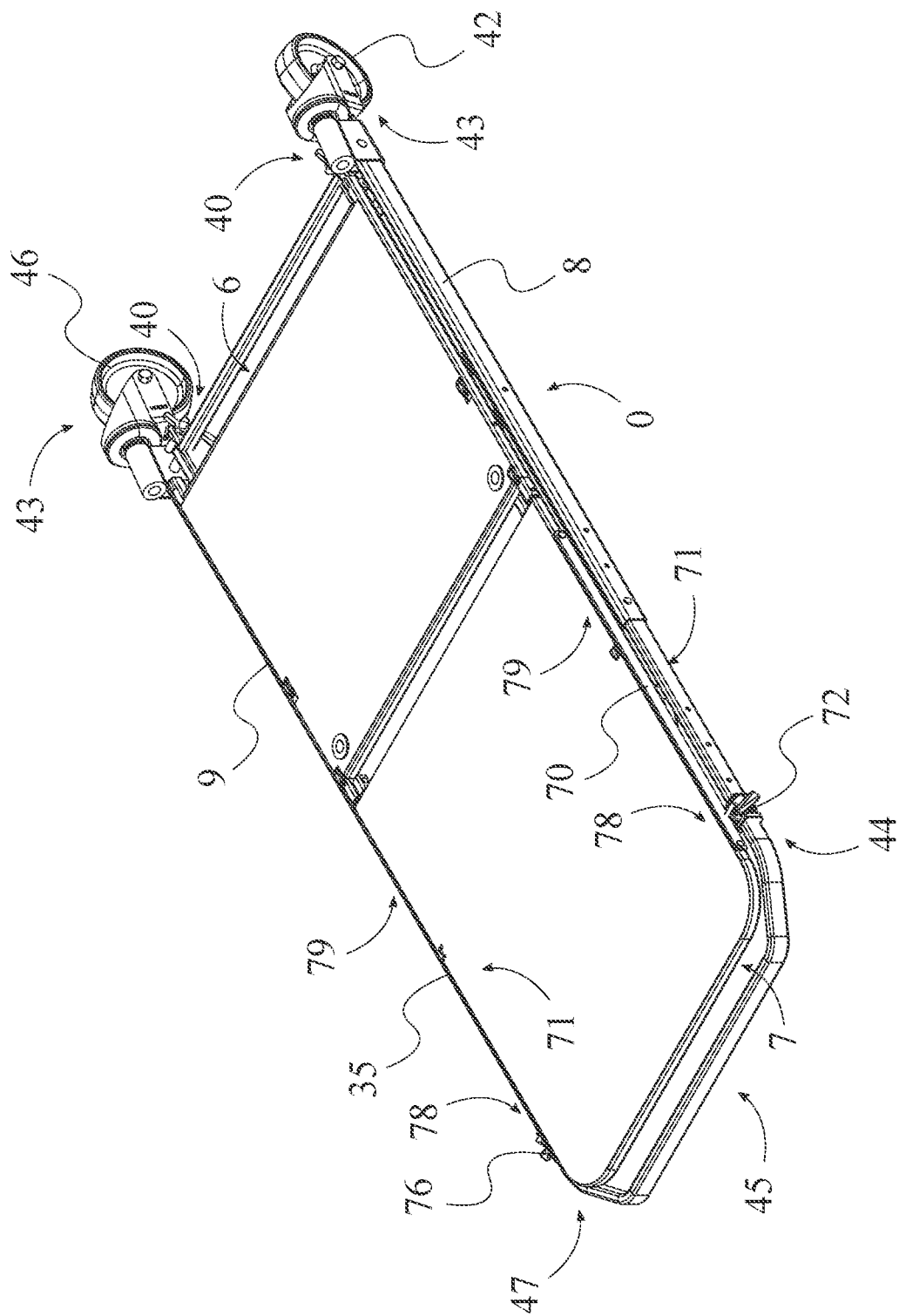
FIG. 6 is a perspective view of the present invention in the collapsed configuration.

When a user has finished moving items with the present invention, a user may wish to store the present invention away. To enable this, the rack assembly 1 and the extension frame 7 may be arranged into a collapsed configuration, as seen in FIG. 6. The collapsed configuration relates to an arrangement in which the components of the present invention align to form a generally flat unit optimized for storage. The second panel 5 and the third panel 6 are fixed coplanar to each other. This arrangement results in a generally flat surface atop the second panel 5 and the third panel 6. The first panel 2 is fixed parallel and adjacent to the second panel 5 and the third panel 6. In this way, the first panel 2, second panel 5, and third panel 6 collapse into a generally flat arrangement. The extension frame 7 is fixed coincident with the second panel 5 and the third panel 6. By rotating the extension frame 7 about the orientation mechanism 17, the extension frame 7 can also align, resulting in an overall flat shape of the present invention.

The extension frame 7 must be capable of transferring pressure from a user to the pair of fixed wheels 13 in order to enable the present invention to move during use. To this end, the extension frame 7 may comprise a left frame post 8 and a right frame post 9, as seen in FIG. 4. The left frame post 8 denotes a rigid member capable of transferring pressure to the pair of fixed wheels 13. Similarly, the right frame post 9 denotes a rigid member capable of transferring pressure to the pair of fixed wheels 13. The pair of fixed wheels 13 may comprise a left fixed wheel 14 and a right fixed wheel 15. The left fixed wheel 14 is a rotating unit capable of supporting the left side of the present invention. Similarly, the right fixed wheel 15 is a rotating unit capable of supporting the right side of the present invention. The left frame post 8 and the right frame post 9 are positioned parallel and offset from each other. This arrangement orients the left frame post 8 and the right frame post 9 in alignment with the left fixed wheel 14 and the right fixed wheel 15, respectively. The left fixed wheel 14 is terminally and rotatably connected to the left frame post 8. Thus, a user who applies force to the left frame post 8 generates rotational motion in the left fixed wheel 14. Similarly, the right fixed wheel 15 is terminally and rotatably connected to the right frame post 9. Thus, a user who applies force to the right frame post 9 generates rotational motion in the right fixed wheel 15.

It is often advantageous for the left frame post 8 and the right frame post 9 to adjust according to the needs of a user. To this end, the left frame post 8 and the right frame post 9 may be a pair of length-adjustable telescopic posts, as seen in FIG. 1. In this way, a user may adjust the pair of length-adjustable telescopic posts in order to consequently position the handlebar frame 10 as desired.

Figure 2:
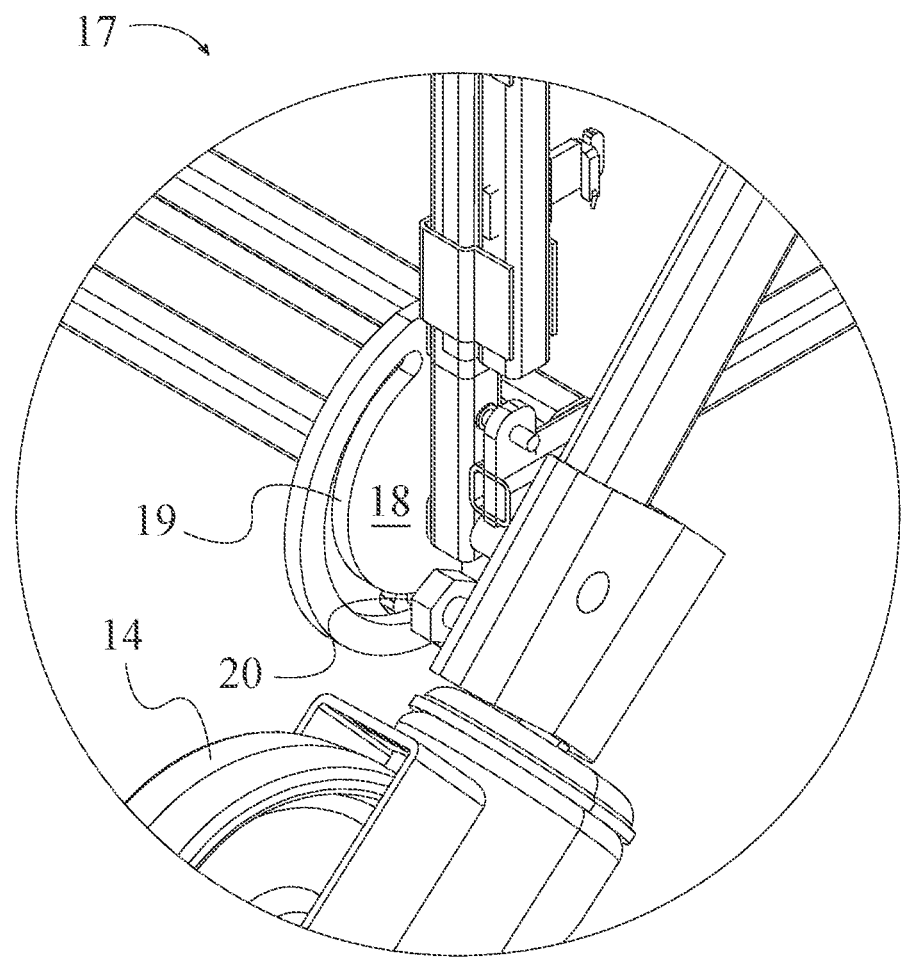
FIG. 2 is a detailed view of FIG. 1 about circle 2 showing the left orientation mechanism.
Figure 3:
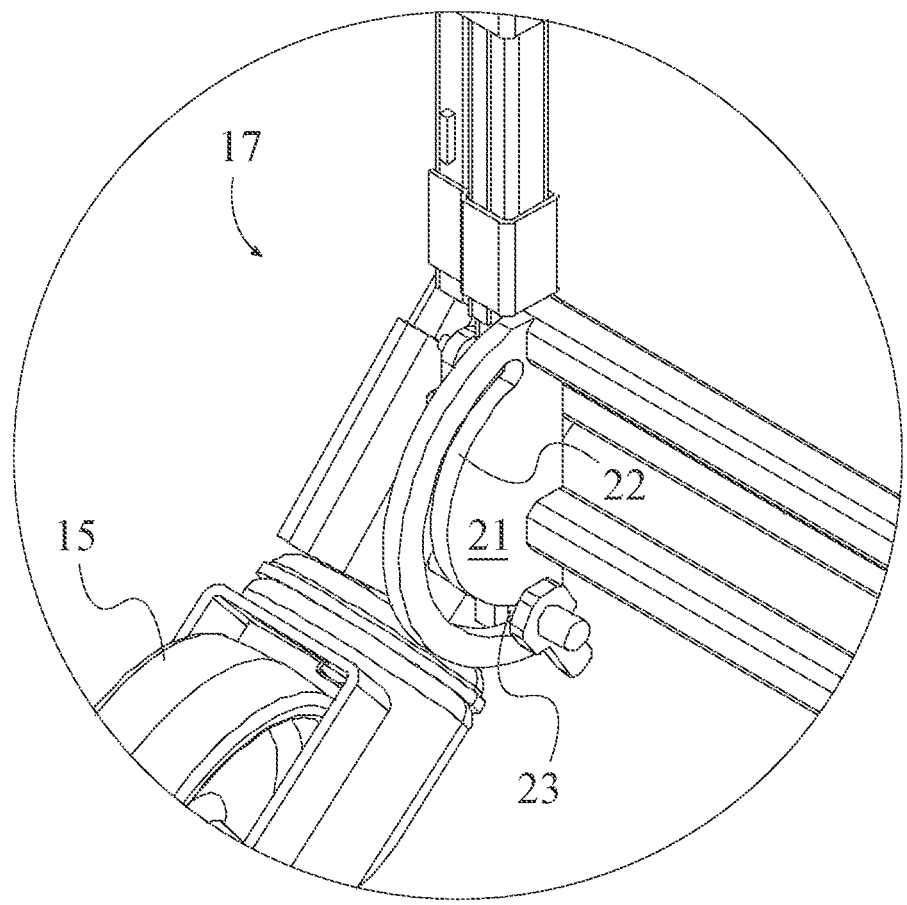
FIG. 3 is a detailed view of FIG. 1 about circle 3 showing the right orientation mechanism.

The orientation mechanism 17 must enable the left frame post 8 and the right frame post 9 to adjust according to the needs of the user. To enable this, the orientation mechanism 17 may comprise a left plate 18, a left semicircular track 19, a left peg 20, a right plate 21, a right semicircular track 22, and a right peg 23. The left plate 18 is a rigid, generally disk-shaped extrusion capable of supporting the left frame post 8, as seen in FIG. 2. The left semicircular track 19 is a cut into the left plate 18 which provides guidance for motion of a protrusion placed within. The left peg 20 relates to a rigid protrusion which extends into the left semicircular track 19 to provide guidance for attached components. Similarly, the right plate 21 is a rigid, generally disk-shaped extrusion capable of supporting the right frame post 9, as seen in FIG. 3. The right semicircular track 22 is a cut into the right plate 21 which provides guidance for motion of a protrusion placed within. The right peg 23 relates to a rigid protrusion which extends into the right semicircular track 22 to provide guidance for attached components. Moreover, the left plate 18 and the right plate 21 are positioned perpendicular to the first panel 2. This arrangement positions the left plate 18 and the right plate 21 appropriately for adjustment of the extension frame 7. The left plate 18 is connected adjacent to the rack assembly 1. In this way, the left plate 18 can manipulate the rack assembly 1 according to the user's preferences. The left semicircular track 19 is integrated across the left plate 18. This arrangement enables components within the left semicircular track 19, specifically, the left peg 20, to follow an arc-shaped path across the left plate 18. The left peg 20 is terminally and perpendicularly connected to the left frame post 8. Thus, motion of the left peg 20 affects the position of the left frame post 8. The left peg 20 is slidably engaged along the left semicircular track 19. In this way, motion of the left frame post 8 is restricted and guided according to motion of the left peg 20. Similarly, the right plate 21 is connected adjacent to the rack assembly 1, opposite the left plate 18. In this way, the right plate 21 can manipulate the rack assembly 1 according to the user's preferences. The right semicircular track 22 is integrated across the right plate 21. This arrangement enables components within the right semicircular track 22, specifically, the right peg 23, to follow an arc-shaped path across the right plate 21. The right peg 23 is terminally and perpendicularly connected to the right frame post 9. Thus, motion of the right peg 23 affects the position of the right frame post 9. The right peg 23 is slidably engaged along the right semicircular track 22. In this way, motion of the right frame post 9 is restricted and guided according to motion of the right peg 23.

In order to operate the present invention, the handlebar frame 10 must be oriented appropriately for each configuration of the present invention. To enable this, the present invention may further comprise a left rotational clamp 24 and a right rotational clamp 25, as seen in FIG. 1. The left rotational clamp 24 relates to a tightening fastener which prevents translational or rotational motion of two members relative to each other. Also, the right rotational clamp 25 relates to a tightening fastener which prevents translational or rotational motion of two members relative to each other. The handlebar frame 10 is a U-shaped member. This ensures that the user has convenient and intuitive access to the handlebar frame 10. The U-shaped member comprises a left member end 11 and a right member end 12. The left member end 11 denotes a terminal segment of the U-shaped member. Similarly, the right member end 12 denotes a terminal segment of the U-shaped member. The left member end 11 is hingedly and terminally connected to the left frame post 8 by the left rotational clamp 24, opposite to the left fixed wheel 14. Thus, the left rotational clamp 24 is able to fix the left member end 11, and in turn, the U-shaped member, is fixed in place relative to the left frame post 8. In this way, motion of the left member end 11 generates corresponding motion in the left frame post 8 and the left fixed wheel 14. The right member end 12 is hingedly and terminally connected to the right frame post 9 by the right rotational clamp 25, opposite to the right fixed wheel 15. Thus, the right rotational clamp 25 is able to fix the right member end 12, and in turn, the U-shaped member, is fixed in place relative to the right frame post 9. In this way, motion of the right member end 12 generates corresponding motion in the right frame post 9 and the right fixed wheel 15.

The rack assembly 1 may benefit from additional support in order to ensure retention of shape during use. To this end, the present invention may further comprise a stabilization mechanism 26. The stabilization mechanism 26 is a device which joins the first panel 2 and the third panel 6, thereby preventing relative motion of the first panel 2 to the third panel 6. The stabilization mechanism 26 is mounted between the first panel 2 and the third panel 6. This ensures that the stabilization mechanism 26 links potential movement of the first panel 2 to the third panel 6. The stabilization mechanism 26 is positioned offset from the second panel 5. In this way, the stabilization mechanism 26 joins the first panel 2 to the third panel 6 from one end, while the second panel 5 joins the first panel 2 to the third panel 6 from the opposite end.

The stabilization mechanism 26 is preferably a low weight unit which does not interfere with the user's ability to add or remove items from the rack assembly 1. To this end, the stabilization mechanism 26 may comprise at least one left rod 27 and at least one right rod 30. The at least one left rod 27 denotes a rigid elongated member capable of withstanding tensile and compressive stresses. Similarly, the at least one right rod 30 denotes a rigid elongated member capable of withstanding tensile and compressive stresses. The at least one left rod 27 and the at least one right rod 30 each comprise a first rod end 28 and a second rod end 29. The first rod end 28 relates to the segment of the at least one left rod 27 or the at least one right rod 30 which connects to the first panel 2. The second rod end 29 relates to the segment of the at least one left rod 27 or the at least one right rod 30 which connects to the third panel 6. The at least one left rod 27 and the at least one right rod 30 are positioned parallel and offset from each other. This arrangement ensures that the at least one left rod 27 and the at least one right rod 30 can prevent any potential wobbling motion of the first panel 2 relative to the third panel 6. The first rod end 28 of the at least one left rod 27 and the first rod end 28 of the at least one right rod 30 are positioned opposite to each other across the first panel 2. In this way, the at least one left rod 27 and the at least one right rod 30 prevent the first panel 2 from shifting further from or closer to the third panel 6. The first rod end 28 of the at least one left rod 27 and the first rod end 28 of the at least one right rod 30 are hingedly connected to the first panel 2. This arrangement enables the first panel 2 to swivel into different configurations as desired. The second rod end 29 of the at least one left rod 27 and the second rod end 29 of the at least one right rod 30 are positioned opposite to each other across the third panel 6. In this way, the at least one left rod 27 and the at least one right rod 30 prevent the third panel 6 from shifting further from or closer to the first panel 2. The second rod end 29 of the at least one left rod 27 and the second rod end 29 of the at least one right rod 30 are hingedly connected to the third panel 6. This arrangement enables the third panel 6 to swivel into different configurations as desired.

A user may wish to access the contents of the racking assembly during use. To enable this, the first panel 2 may comprise a pullout panel portion 3 and a base panel portion 4, as seen in FIG. 1. The pullout panel portion 3 relates to a rigid, generally flat unit which connects to the base panel portion 4 to form the first panel 2. The base panel portion 4 is a stationary unit which moves relative to the pullout panel portion 3. The pullout panel portion 3 traverses into the base panel portion 4, opposite to the hinged connection between the first panel 2 and the second panel 5. In this way, the pullout panel portion 3 motion is restricted along the first panel 2. The pullout panel portion 3 is slidably mounted to the base panel portion 4. Thus, the pullout panel portion 3 may slide to provide access to the contents of the present invention or may slide to prevent items from sliding out through the opening created when the pullout panel portion 3 slides open.

Although the invention has been explained in relation to its preferred embodiment, it is to be understood that many other possible modifications and variations can be made without departing from the spirit and scope of the invention as hereinafter claimed.

What is claimed is:
1. A convertible cart comprises:
a rack assembly;
an extension frame;
a handlebar frame;
a pair of fixed wheels;
a pair of rearrangeable casters;
an orientation mechanism;
the rack assembly comprises a first panel, a second panel, and a third panel;
the first panel being hingedly and adjacently connected to the second panel;
the third panel being hingedly and adjacently connected to the second panel, opposite the first panel;
the handlebar frame being terminally mounted to the extension frame;
the pair of fixed wheels being terminally and rotatably mounted to the extension frame, opposite the handlebar frame;
the orientation mechanism being positioned adjacent to the pair of fixed wheels;
the orientation mechanism being positioned adjacent to the hinged connection between the first panel and the second panel;
the extension frame being operatively coupled to the rack assembly by the orientation mechanism, wherein the orientation mechanism is used to reposition the extension frame in relation to the rack assembly for a selected configuration; and
the pair of rearrangeable casters being mounted onto the rack assembly.

2. The convertible cart as claimed in claim 1 comprises:
wherein the rack assembly, the extension frame, and the pair of rearrangeable casters are arranged into a basket-cart configuration;
the first panel and the third panel being fixed parallel and offset to each other;
the second panel being fixed perpendicular to the first panel and the third panel;
the extension frame being fixed at an acute angle with the second panel;
the extension frame being intersected by the third panel;
the pair of rearrangeable casters being mounted onto the second panel; and
the pair of rearrangeable casters being positioned offset from the pair of fixed wheels.

3. The convertible cart as claimed in claim 1 comprises:
wherein the rack assembly, the extension frame, and the pair of rearrangeable casters are arranged into a tiered-cart configuration;
the first panel and the third panel being fixed parallel and offset to each other;
the second panel being fixed perpendicular to the first panel and the third panel;
the extension frame being fixed coincident with the second panel;
the pair of rearrangeable casters being mounted onto the first panel; and
the pair of rearrangeable casters being positioned offset from the pair of fixed wheels.

4. The convertible cart as claimed in claim 1 comprises:
wherein the rack assembly, the extension frame, and the pair of rearrangeable casters are arranged into a flat-cart configuration;
the second panel and the third panel being fixed coplanar to each other;
the first panel being fixed parallel and adjacent to the second panel and the third panel;
the extension frame being fixed perpendicular with the second panel;
the pair of rearrangeable casters being mounted onto the first panel; and
the pair of rearrangeable casters being positioned offset from the pair of fixed wheels.

5. The convertible cart as claimed in claim 1 comprises:
wherein the rack assembly and the extension frame are arranged into a collapsed configuration;
the second panel and the third panel being fixed coplanar to each other;
the first panel being fixed parallel and adjacent to the second panel and the third panel; and
the extension frame being fixed coincident with the second panel and the third panel.

6. The convertible cart as claimed in claim 1 comprises:
the extension frame comprises a left frame post and a right frame post;

the pair of fixed wheels comprises a left fixed wheel and a right fixed wheel;

the left frame post and the right frame post being positioned parallel and offset from each other;

the left fixed wheel being terminally and rotatably connected to the left frame post; and the right fixed wheel being terminally and rotatably connected to the right frame post.

7. The convertible cart as claimed in claim 6, wherein the left frame post and the right frame post are a pair of length-adjustable telescopic posts.

8. The convertible cart as claimed in claim 6 comprises:

the orientation mechanism comprises a left plate, a left semicircular track, a left peg, a right plate, a right semicircular track, and a right peg;

the left plate and the right plate being positioned perpendicular to the first panel;

the left plate being connected adjacent to the rack assembly;

the left semicircular track being integrated across the left plate;

the left peg being terminally and perpendicularly connected to the left frame post;

the left peg being slidably engaged along the left semicircular track;

the right plate being connected adjacent to the rack assembly, opposite the left plate;

the right semicircular track being integrated across the right plate;

the right peg being terminally and perpendicularly connected to the right frame post; and the right peg being slidably engaged along the right semicircular track.

9. The convertible cart as claimed in claim 6 comprises:

a left rotational clamp;

a right rotational clamp;

the handlebar frame being a U-shaped member;

the U-shaped member comprises a left member end and a right member end;

the left member end being hingedly and terminally connected to the left frame post by the left rotational clamp, opposite to the left fixed wheel; and the right member end being hingedly and terminally connected to the right frame post by the right rotational clamp, opposite to the right fixed wheel.

10. The convertible cart as claimed in claim 1 comprises:

a stabilization mechanism;

the stabilization mechanism being mounted between the first panel and the third panel; and the stabilization mechanism being positioned offset from the second panel.

11. The convertible cart as claimed in claim 10 comprises:

the stabilization mechanism comprises at least one left rod and at least one right rod;

the at least one left rod and the at least one right rod each comprise a first rod end and a second rod end;

the at least one left rod and the at least one right rod being positioned parallel and offset from each other;

the first rod end of the at least one left rod and the first rod end of the at least one right rod being positioned opposite to each other across the first panel;

the first rod end of the at least one left rod and the first rod end of the at least one right rod being hingedly connected to the first panel;

the second rod end of the at least one left rod and the second rod end of the right at least one rod being positioned opposite to each other across the third panel; and the second rod end of the at least one left rod and the second rod end of the at least one right rod being hingedly connected to the third panel.

12. The convertible cart as claimed in claim 1 comprises:

the first panel comprises a pullout panel portion and a base panel portion;

the pullout panel portion traversing into the base panel portion, opposite to the hinged connection between the first panel and the second panel; and the pullout panel portion being slidably mounted to the base panel portion.

13. A convertible cart comprises:

a rack assembly;

an extension frame;

a handlebar frame;

a pair of fixed wheels;

a pair of rearrangeable casters;

an orientation mechanism;

the rack assembly comprises a first panel, a second panel, and a third panel;

the first panel comprises a pullout panel portion and a base panel portion;

the first panel being hingedly and adjacently connected to the second panel;

the third panel being hingedly and adjacently connected to the second panel, opposite the first panel;

the handlebar frame being terminally mounted to the extension frame;

the pair of fixed wheels being terminally and rotatably mounted to the extension frame, opposite the handlebar frame;

the orientation mechanism being positioned adjacent to the pair of fixed wheels;

the orientation mechanism being positioned adjacent to the hinged connection between the first panel and the second panel;

the extension frame being operatively coupled to the rack assembly by the orientation mechanism, wherein the orientation mechanism is used to reposition the extension frame in relation to the rack assembly for a selected configuration;

the pair of rearrangeable casters being mounted onto the rack assembly;

the pullout panel portion traversing into the base panel portion, opposite to the hinged connection between the first panel and the second panel; and the pullout panel portion being slidably mounted to the base panel portion.

14. The convertible cart as claimed in claim 13 comprises:

wherein the rack assembly, the extension frame, and the pair of rearrangeable casters are arranged into a basket-cart configuration;

the first panel and the third panel being fixed parallel and offset to each other;

the second panel being fixed perpendicular to the first panel and the third panel;

the extension frame being fixed at an acute angle with the second panel;

the extension frame being intersected by the third panel;

the pair of rearrangeable casters being mounted onto the second panel; and the pair of rearrangeable casters being positioned offset from the pair of fixed wheels.

15. The convertible cart as claimed in claim 13 comprises:
wherein the rack assembly, the extension frame, and the pair of rearrangeable casters are arranged into a tiered-cart configuration;
the first panel and the third panel being fixed parallel and offset to each other;
the second panel being fixed perpendicular to the first panel and the third panel;
the extension frame being fixed coincident with the second panel;
the pair of rearrangeable casters being mounted onto the first panel; and
the pair of rearrangeable casters being positioned offset from the pair of fixed wheels.

16. The convertible cart as claimed in claim 13 comprises:
wherein the rack assembly, the extension frame, and the pair of rearrangeable casters are arranged into a flat-cart configuration;
the second panel and the third panel being fixed coplanar to each other;
the first panel being fixed parallel and adjacent to the second panel and the third panel;
the extension frame being fixed perpendicular with the second panel;
the pair of rearrangeable casters being mounted onto the first panel; and
the pair of rearrangeable casters being positioned offset from the pair of fixed wheels.

17. The convertible cart as claimed in claim 13 comprises:
wherein the rack assembly and the extension frame are arranged into a collapsed configuration;
the second panel and the third panel being fixed coplanar to each other;
the first panel being fixed parallel and adjacent to the second panel and the third panel; and
the extension frame being fixed coincident with the second panel and the third panel.

18. The convertible cart as claimed in claim 13 comprises:
a left rotational clamp;
a right rotational clamp;
the handlebar frame being a U-shaped member;
the extension frame comprises a left frame post and a right frame post;
the pair of fixed wheels comprises a left fixed wheel and a right fixed wheel;
the orientation mechanism comprises a left plate, a left semicircular track, a left peg, a right plate, a right semicircular track, and a right peg;
the U-shaped member comprises a left member end and a right member end;
the left frame post and the right frame post being positioned parallel and offset from each other;
the left fixed wheel being terminally and rotatably connected to the left frame post;
the right fixed wheel being terminally and rotatably connected to the right frame post;
the left plate and the right plate being positioned perpendicular to the first panel;
the left plate being connected adjacent to the rack assembly;
the left semicircular track being integrated across the left plate;
the left peg being terminally and perpendicularly connected to the left frame post;
the left peg being slidably engaged along the left semicircular track;
the right plate being connected adjacent to the rack assembly, opposite the left plate;
the right semicircular track being integrated across the right plate;
the right peg being terminally and perpendicularly connected to the right frame post;
the right peg being slidably engaged along the right semicircular track;
the left member end being hingedly and terminally connected to the left frame post by the left rotational clamp, opposite to the left fixed wheel; and
the right member end being hingedly and terminally connected to the right frame post by the right rotational clamp, opposite to the right fixed wheel.

19. The convertible cart as claimed in claim 18, wherein the left frame post and the right frame post are a pair of length-adjustable telescopic posts.

20. The convertible cart as claimed in claim 13 comprises:
a stabilization mechanism;
the stabilization mechanism comprises at least one left rod and at least one right rod;
the at least one left rod and the at least one right rod each comprise a first rod end and a second rod end;
the stabilization mechanism being mounted between the first panel and the third panel;
the stabilization mechanism being positioned offset from the second panel;
the at least one left rod and the at least one right rod being positioned parallel and offset from each other;
the first rod end of the at least one left rod and the first rod end of the at least one right rod being positioned opposite to each other across the first panel;
the first rod end of the at least one left rod and the first rod end of the at least one right rod being hingedly connected to the first panel;
the second rod end of the at least one left rod and the second rod end of the right at least one rod being positioned opposite to each other across the third panel; and
the second rod end of the at least one left rod and the second rod end of the at least one right rod being hingedly connected to the third panel.

* * * * *